United States Patent [19]

Coutrot

[11] Patent Number: 4,763,283

[45] Date of Patent: Aug. 9, 1988

[54] COLOR TRANSCODING PROCESS PERMITTING THE INTERCONNECTION OF TWO DEFINITION EQUIPMENTS OF DIFFERENT COLORS AND THE CORRESPONDING TRANSCODER

[75] Inventor: Francoise Coutrot, Ercé-prés-Liffré, France

[73] Assignee: Centre National d'Etudes des Telecommunications and l'Establissement Public Telediffusion de France, Les Ulis, France

[21] Appl. No.: 817,834

[22] PCT Filed: Apr. 16, 1985

[86] PCT No.: PCT/FR85/00088

§ 371 Date: Dec. 10, 1985

§ 102(e) Date: Dec. 10, 1985

[87] PCT Pub. No.: WO85/04977

PCT Pub. Date: Nov. 7, 1985

[30] Foreign Application Priority Data

Apr. 20, 1984 [FR] France .............................. 84 06304

[51] Int. Cl.[4] ........................ G06F 15/62; G09G 1/28

[52] U.S. Cl. .................................. 364/526; 364/521; 340/703

[58] Field of Search ....................... 340/703, 717, 701; 364/526, 521; 358/75, 136, 200

[56] References Cited

U.S. PATENT DOCUMENTS

| | | | |
|---|---|---|---|
| 4,549,172 | 10/1985 | Welk | 340/703 |
| 4,580,134 | 4/1986 | Campbell et al. | 340/703 |
| 4,583,118 | 4/1986 | Mallinson et al. | 364/521 |
| 4,631,696 | 12/1986 | Broedner | 340/701 X |
| 4,635,048 | 1/1987 | Nishi et al. | 340/703 |
| 4,648,050 | 3/1987 | Yamagami | 364/526 |
| 4,653,014 | 3/1987 | Mikami et al. | 364/526 |
| 4,688,170 | 8/1987 | Waite et al. | 340/717 X |
| 4,712,099 | 12/1987 | Maeda | 340/703 |

OTHER PUBLICATIONS

Shi-Kuo Chang et al., "Optimal Histogram Matching by Monotone Gray Level Transformation", *Communications of the ACM,* vol. 21, No. 10, Oct. 1978, pp. 835-840.

*Primary Examiner*—Parshotam S. Lall
*Assistant Examiner*—Joseph L. Dixon
*Attorney, Agent, or Firm*—Oblon, Fisher, Spivak, McClelland & Maier

[57] ABSTRACT

A process and apparatus for connecting the color coding of one equipment to another equipment. The position of the color of character Cc of the first equipment in the interval Ci−Ci+1 of two successive colors of the second equipment and the position of the background color Cf in the interval Cj−Cj+1 are determined. As a function of these positions, the character color is taken either as Ci, or as Ci+1. The background color is taken either as Cj or Cj+1.

7 Claims, 15 Drawing Sheets

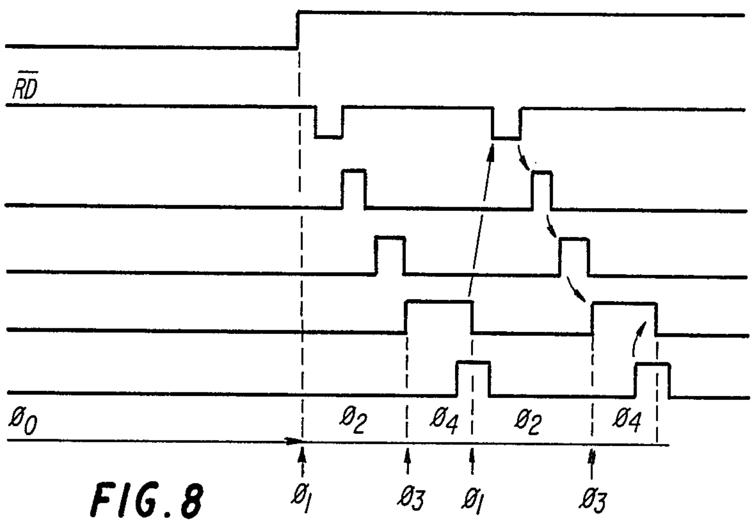
FIG. 8
| | |
|---|---|
| $b_0$ | $b_1$ |
| $b_2$ | $b_3$ |
| $b_4$ | $b_6$ |
FIG. 9A
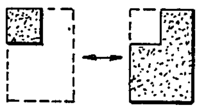
FIG. 9B
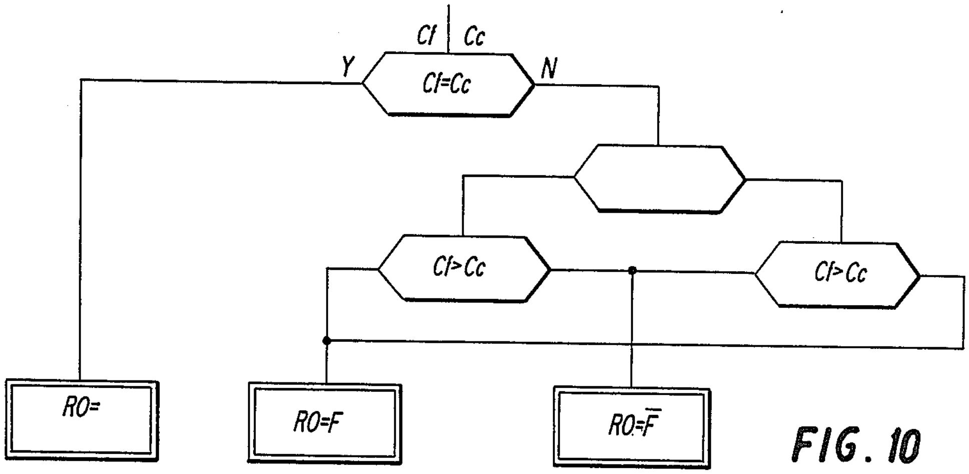
FIG. 10

COLOR TRANSCODING PROCESS PERMITTING THE INTERCONNECTION OF TWO DEFINITION EQUIPMENTS OF DIFFERENT COLORS AND THE CORRESPONDING TRANSCODER

BACKGROUND OF THE INVENTION

1. Field of the Invention

The present invention relates to a color transcoding process and to the corresponding transcoder.

2. Discussion of Background

The invention makes it possible to connect on input equipment with an output equipment. The input equipment incorporates a page memory, whose content is able to define a mosaic-type image formed from characters each defined by a shape, a character color, a background color and various other attributes, the character and background colors being taken from a group of N colors. The output equipment incorporates a means for the display of an image of the mosaic type with the aid of characters also having a shape, a character color and a background color, the character and background colors being taken from a group of M colors, M being smaller than N.

The present invention has a very wide application field. It in particular covers videography which, as is known, is a telecommunications process making it possible to supply to a user alphanumeric or graphic messages on a display screen. In its transmitted variant, this process is often called "teletext" and in its interactive variant is often called "videotex". The invention can also apply to the field of computers or microcomputers, as well as to that of printers, together with various display devices such as flat-faced screens.

The problem which the present invention proposes to solve is that of incompatibility between equipment working with a different number of colors. For example, this is the case when it is wished to display an eight color videography image or picture on a two-color flat-faced screen, or when it is wished to couple a high definition microcomputer using 64 colors with an 8 color printer and so on.

FIGS. 1 and 2 illustrate the position occupied by the transcoder according to the invention in known installations having two incompatible equipments. In FIG. 1, transcoder TR is located between an input equipment EQE and an output equipment EQS. FIG. 2 shows how said same transcoder is inserted in a videography chain having a central processing unit UCT, a page memory MP, a display unit UV and a television receiver RT. The transcoder is then inserted between page memory MP and display unit UV and it makes it possible to control an output equipment EQS.

The invention is applicable in the case where the images to be processed are images of a mosaic type. It is known that such images are formed from characters, each character being included in a matrix. The mosaic image is constituted by a grid (row, column) of such matrixes, which are arranged contiguously both in the horizontal and vertical directions. The characters are either alphanumeric or graphic. FIG. 3 shows an alphanumeric character (in the present case A). Such a character is defined by a shape F, by the character color, i.e. Cc (said color being diagrammatically indicated by sloping stripes) and by the background color, i.e. Cf (diagrammatically indicated by dots). Certain other attributes of the character can be added to the two aforementioned attributes (such as e.g. flashing, height, width, etc.). With regards to the graphic characters, examples will be given hereinafter in connection with FIGS. *9a* and *9b*.

For certain output equipment only having two colors (e.g. certain printers or flat-faced screens), the background color is necessarily that of the support used (paper in the first case and screen in the second) and the character color is necessarily that of the ink of the tape (for the printer) or that of the excited material (for the screen). If it is a liquid crystal screen, the screen background is generally bright and the character dark. In the case of a cathode ray tube screen, the background is generally dark and the character bright.

These examples show that there is frequently a reversal operation (translated by a binary signal I), making it possible to pass from a display mode to the complementary mode (such as e.g. a bright character on a dark background or a black character on a white background).

The principle of the invention is firstly to establish a correspondence table between the N colors of the input equipment and the M colors of the output equipment. If K0, K1, . . . , KN−2, KN−1 are used for designating the N colors of the input equipment, it is possible to classify the colors in a certain order. As in practice the color information is coded by binary words, this amounts to classifying such words. The left-hand part of FIG. 4 shows the N colors in question in the form of horizontal lines.

For example, for a group of N=8 colors, it is possible to adopt the following classification, which is based on a brightness increase:

| N colors | N words of n bits |
|---|---|
| BLACK | 000 |
| BLUE | 001 |
| RED | 010 |
| MAGENTA | 011 |
| GREEN | 100 |
| CYAN | 101 |
| YELLOW | 110 |
| WHITE | 111 |

However, other criteria can be used for classifying the N colors. Moreover, it is advantageous to work with groups of colors containing a number of colors equal to an exact power of 2 $N=2^n$ (in the example considered hereinbefore one has $N=2^3$). The number of bits of the words translating the colors is then equal to n (to 3 in the above example). However, the invention is obviously not limited to this single case.

It is pointed out that the numerical code chosen is not necessarily the color code used for the display on a color television-type screen, such as screen RT in FIG. 2.

The correspondence table to be established must make it possible to associate with each of the N colors K0, K1, . . . , KN−1, one of the M colors C0, C1, . . . , CM−2, CM−1 of the output equipment. Thus, it is necessary to establish in the same way a second color scale with these M colors. As M is hypothetically less than N, the two scales do not coincide. This second scale is shown in the median part of FIG. 4.

Assuming that the number M is also an exact power of 2, i.e. $2^m$, each color C can be associated with a word having m bits, so that m is smaller than n.

Generally the extreme colors C0 and CM−1 are black and white, so that it is logical to make K0 correspond to C0 and KN−1 to CM−1. Transcoding between a color K and a color C only really applies with the intermediate colors.

SUMMARY OF THE INVENTION

According to the invention, the transcoding operation will consist of processing on binary words, each associated with colors of the two groups. As these words do not have the same number of bits (the N colors are associated with words of n bits and the M colors with words of m bits), the latter is firstly completed by n-m low-order bits. For Co, which has m bits equal to zero, it is obvious that the word will be completed with n-m other bits equal to 0 in order to obtain a word identical to that characterizing K0. Thus, output color Co will immediately be made to correspond to the input color Ko. For CM−1, which comprises m times bit 1, the word will be completed by n-m low-order bits equal to 1, which will give a word of n bits identical to that of KN−1. For the intermediate colors, the words of m bits will be completed by bits equal to zero or to 1, as a function of the colors in question, on bringing about coincidence of the intermediate colors common to both systems.

A character to be displayed is defined by a character color Cc taken from among the N colors K0, . . . , KN−1 and a background color Cf taken from among the same colors. Color Cc can also be identical to Cf, in which case it is a question of displaying a uniform space. The problem amounts to attributing to Cc and to Cf two colors taken from among the m colors C0, . . . , CM−1.

In general, Cc does not coincide with one of these colors and falls between two of them, which is respectively designated Ci and Ci+1, the symbol i being a number between 0 and M−2.

In the same way, Cf does not necessarily coincide with one of the colors of the output equipment and falls between two colors Cj and Cj+1, the symbol j also being a number between 0 and M−2.

Naturally, in certain cases i and j can be equal.

The invention makes it possible to choose between the colors Ci and Ci+1 for the character color Cc and between Cj and Cj+1 for the background color.

The correspondence between a color and a binary word having been defined in this way, the notations Cc, Cf, Ci, Cj etc. will hereinafter designate both the colors and the numerical words translating them.

The transcoding process according to the invention is then characterized in that it comprises the following operations:

for each character defined by the words Cc and Cf, the range Ci−Ci+1 in which the word Cc and the range Cj−Cj+1 in which is found the word Cf are determined.

either color Ci, or color Ci+1 is made to correspond with color Cc and either color Cj, or color Cj+1 is made to correspond to color Cf, the choice between said double alternative being fixed in accordance with the following criteria: firstly words Cf and Cc are compared:

(A) if word Cc is not equal to word Cf, then the shape or form of the character is not modified and word Ci is compared with word Cj to determine whether Ci is equal to Cj or whether Ci is not equal to Cj, (Aa) if Ci is not equal to Cj:

(Aa1) determination takes place to establish which is the smallest of the two differences Cf−Cj and Cj+1−Cf; if Cf−Cj is the smaller difference, then Cf is chosen for color Cj; in the opposite case Cf is chosen for the color Cj+1.

(Aa2) determination takes place as to which is the smallest of the differences Cc−Ci and Ci+1−Cc; if Cc−Ci is the smaller difference then color Ci is chosen for Cc; in the opposite case the color Ci+1 is chosen for Cc, (Ab) if word Ci is equal to word Cj, determination takes place to establish whether Cf is smaller than Cc and in the affirmative color Ci is chosen for Cf and color Ci+1 for Cc, whereas in the negative color Ci+1 is chosen for Cf and color Ci for Cc;

(B) if the word Cf is equal to the word Cc, the form or shape of the character is identical to the background and the color of this space is taken as equal to one of the colors Ci and Ci+1.

In the right-hand part of FIG. 4 are shown in general manner, the intervals involved in the choice process described hereinbefore. This representation makes it clear that from among the M colors of the second group that coming closest to the initial color is sought.

As each color is associated with a binary word, the choice can be determined by realising a decision algorithm relating to the words in question. Graphically the aforementioned operations are translated as represented in FIG. 5, where the double rectangles represent the results and the hexagons the tests.

If the first comparison test between Cf and Cc leads to a negative result (Cf differing from Cc), this means that the shape of the character is determined by the word F taken in the page memory. If the result is positive (Cf=Cc), this means that there is no character distinguished from the background by its color. In other words, the shape fills the entire space of the matrix of the mosaic. The choice of color is then arbitrary. It can be fixed on Ci+1 (this is the case indicated in FIG. 5, rectangle bottom left). However, it is also possible to choose the "lower" color Ci.

The invention also relates to a transcoder performing the process described hereinbefore.

BRIEF DESCRIPTION OF THE DRAWINGS

The invention is described in greater detail hereinafter relative to non-limitative embodiments and the attached drawings, wherein show.

FIGS. *6a* and *6b* the block diagram of the transcoder according to the invention.

FIGS. *7a* and *7f* an embodiment of a transcoder in the case of an input equipment with $2^n$ colors and an output equipment with $2^m$ colors.

FIG. 8 a timing chart explaining the operation of the aforementioned transcoder.

FIGS. *9a* and *9b* the structure of the graphical characters.

FIG. 10 an algorithm showing how a reversal test is inserted in the variant of FIGS. *7a* to *7f*.

Figure 11:
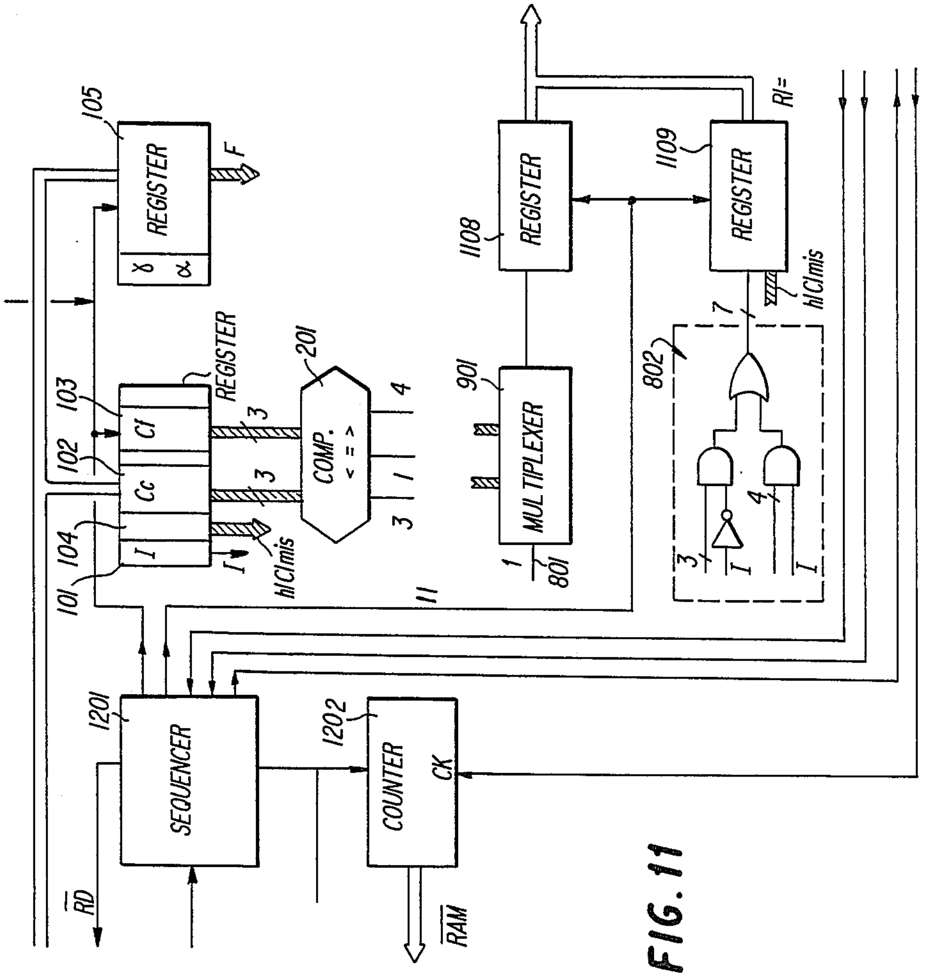

FIG. 11 the structure of the means corresponding to the previous case.

Figure 12:
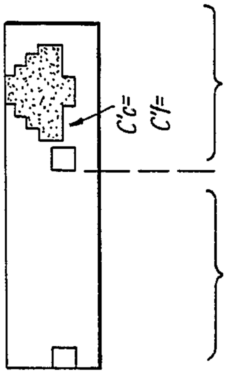

FIG. 12 a group of characters with a non-reversible zone and a reversible zone.

Figure 13:
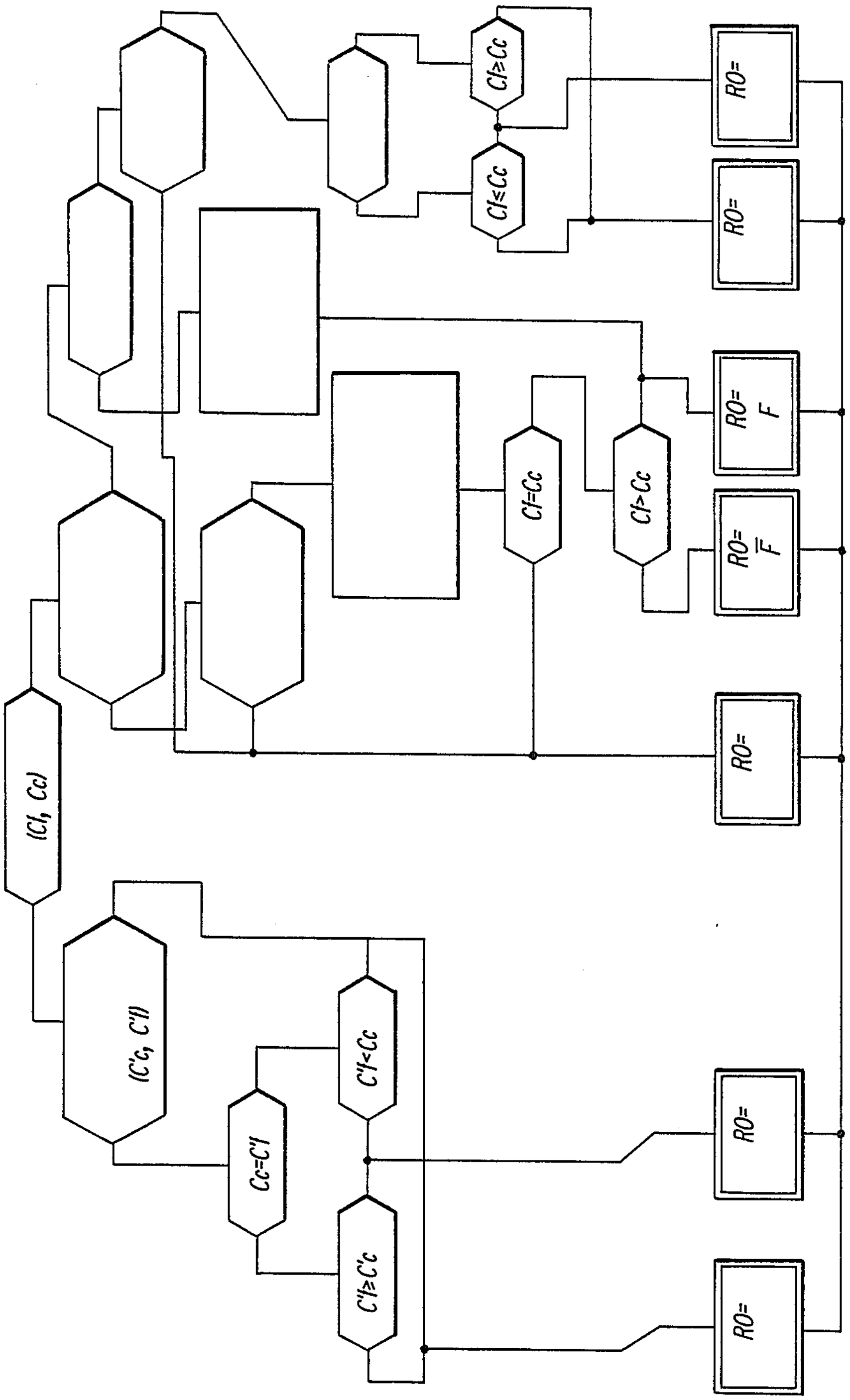

FIG. 13 a flowchart illustrating the decision process in the case of application to 16 bit videotex.

FIGS. 14*a* to 14*f* an embodiment of the transcoder corresponding to the previous case.

Figure 15:
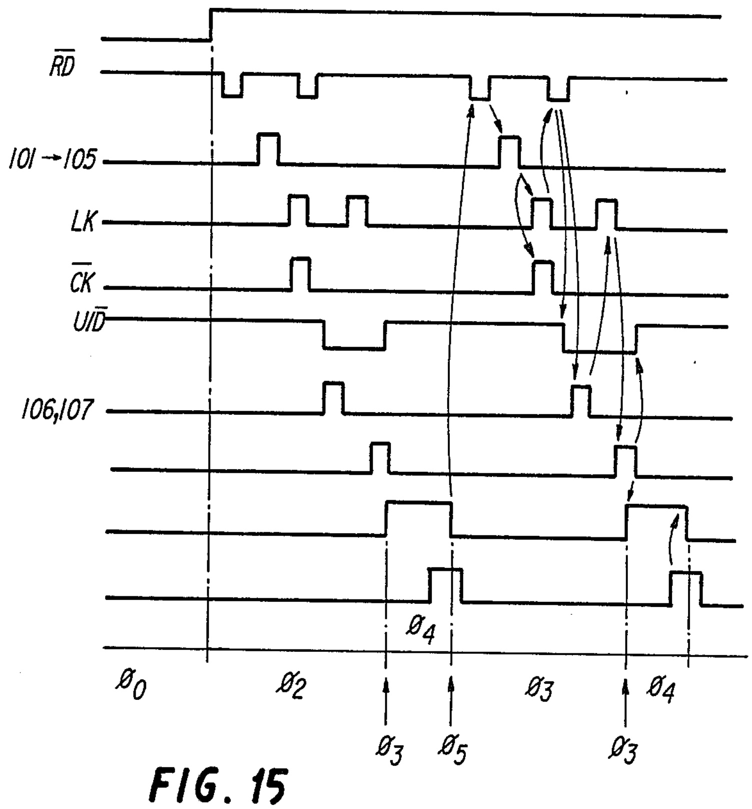
Figure 7D:
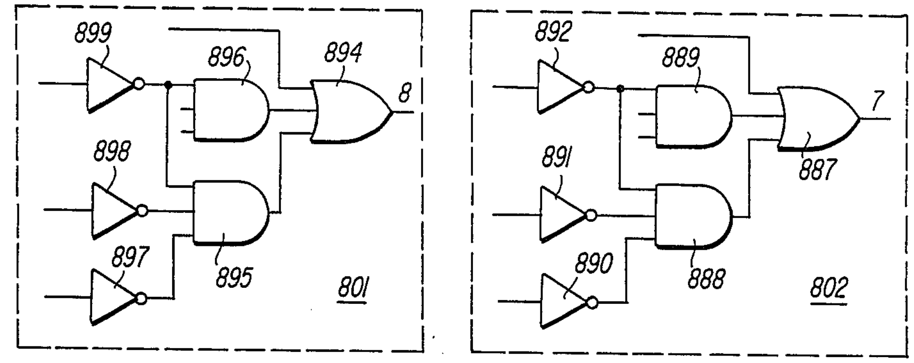
Figure 7E:
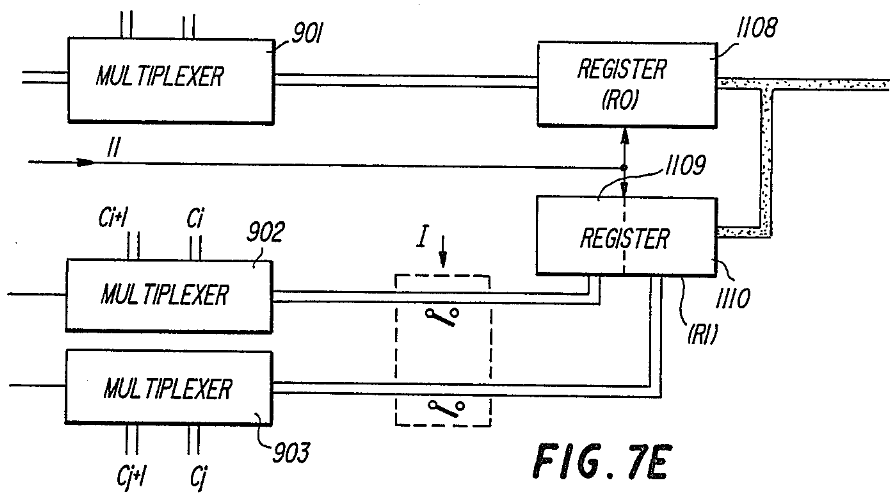
Figure 7F:
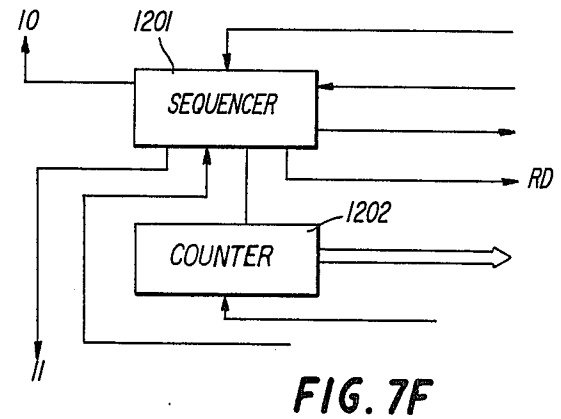

FIG. 15 a timing chart explaining the operation of the transcoder.

DESCRIPTION OF THE PREFERRED EMBODIMENTS

Hereinafter the various members, circuits and other components shown will be referenced with the aid of a number, whereof the hundreds will represent the assembly to which it belongs in the general representation of FIGS. 6*a* and 6*b*. For example a circuit 1002 belongs to block 1000, whilst a circuit 903 belongs to block 900, etc. If a means described does not strictly enter into one of the blocks of FIGS. 6*a* and 6*b* (as will be the case for example of a connection between two blocks or an auxiliary component), said means will carry a numerical reference below 100.

Figure 6A:
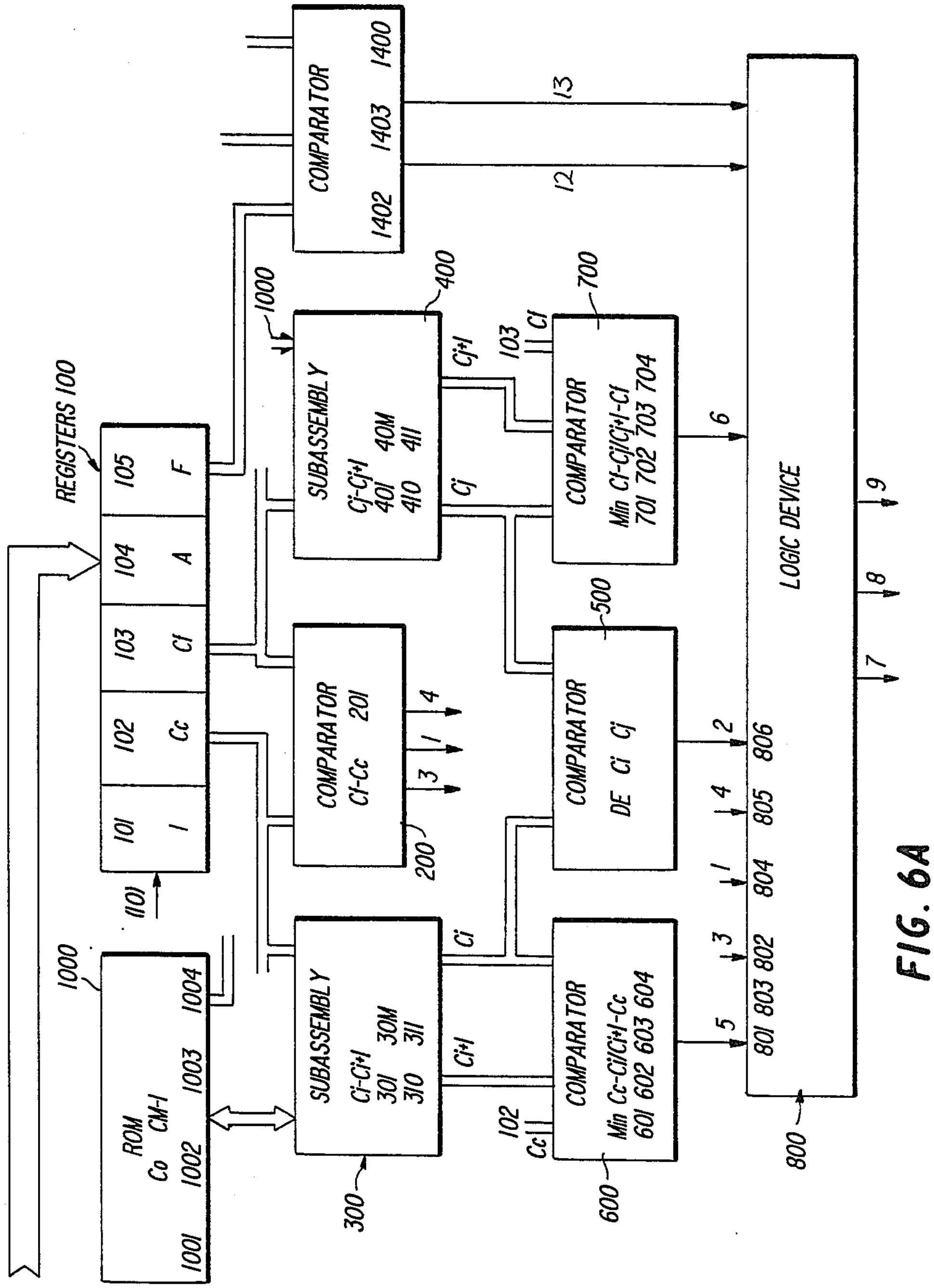
Figure 6B:
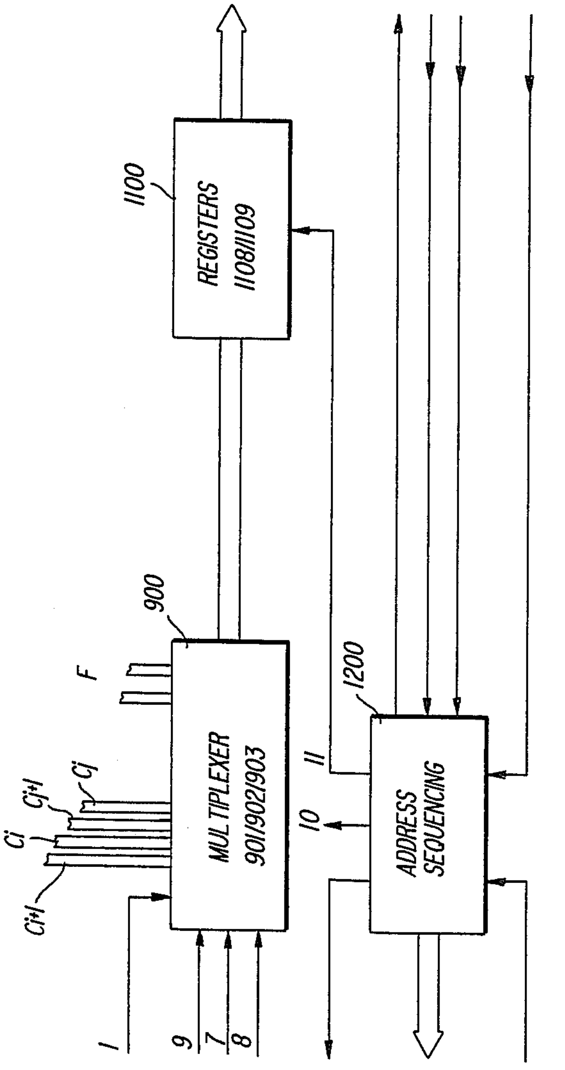

As is shown in general terms in FIGS. 6*a* and 6*b*, the transcoder comprises:

a group of input registers 100 connected by a bus to the page memory of the input equipment, said registers being able to store digital data corresponding to the various characters to be displayed and in which said assembly more particularly has a register 101 storing a reversal bit I, a register 102 storing the n bit word corresponding to the character color Cc, a register 103 storing the n bit word corresponding to the background color Cf, a register 104 storing various attributes A and a register 105 storing the word defining the character shape;

a first comparator 200 having two inputs respectively connected to the two input registers 102, 103 from where they receive the words Cc and Cf and three outputs 3, 1 and 4, whereof the binary state indicates whether Cc is respectively lower, equal to or higher than Cf;

a read-only memory 1000 containing the M words Co, C1, . . . , CM−1 of m bits corresponding to the M colours of the output equipment, said words being completed with n bits as stated hereinbefore and classified in a given order, each word being addressable into the memory by a symbol (i or j) defining the order of the word and it will be shown hereinafter that said memory has 4 read-only memories 1001, 1002, 1003, 1004;

a first subassembly 300 making it possible to determine in which range Ci−Ci+1 is located the word Cc, said first subassembly having a first input connected to the input register 102 from where it receives the words Cc and a second input connected to the read-only memory 1000 and two outputs supplying the words Ci and Ci+1 defining the range in which Cc is located;

a second subassembly 400 making it possible to determine in which range Cj−Cj+1 is located the word Cf, said second subassembly having a first input connected to the input register 103 from where it receives the word Cf and a second input connected to the read-only memory 1000 and two outputs supplying the words Cj, Cj+1 defining the range in which is located Cf;

a second comparator 500 having two inputs receiving the words Ci and Cj respectively supplied by subassemblies 300 and 400 and having an output 2, whereof the binary state indicates whether Ci and Cj are or are not equal;

a first comparison unit 600 able to calculate the difference Cc−Ci and Ci+1−Cc and determine which of these two differences is the smaller, the first unit having a first and second inputs respectively connected to the two outputs of the first subassembly 300 from which they receive the words Ci and Ci+1 and a third input connected to input register 102 from which it receives the word Cc, said first unit 600 having an output 5, whereof the binary state indicates whether Cc−Ci is or is not smaller than Ci+1−Cc;

a second comparison unit 700 able to calculate the differences Cf−Cj and Cj+1−Cf and determine which of these two differences is smaller, the second unit having first and second inputs respectively connected to the two outputs of the second subassembly 400 from where they receive the words Cj and Cj+1 and a third input connected to the input register 103 from which it receives the word Cf, said second unit having an output 6, whose binary state indicates whether Cf−Cj is or is not lower than Cj+1−Cf;

a third comparator 1400 with three inputs, whereof one is connected to register 105 containing the form or shape word F and whereof the two others receive the words characterizing the alphanumeric space and the graphic space, said comparator having two outputs 12 and 13 carrying the binary signals translating the result of the comparison between the shape and the spaces (useful in embodiments described hereinafter);

a logic decision circuit 800 having eight inputs respectively connected to the outputs 3, 1 and 4 of the first comparator 200, to the output 5 of the first comparison unit 600, to output 6 of the second comparison unit 700 and to outputs 12 and 13 of the third comparator 1400, said logic circuit 800 have the function of carrying out the aforementioned choice operation and it has three outputs 7, 8, 9;

a multiplexer means 900 having data inputs receiving shape and space words, said multiplexer means 900 also having control inputs connected to the outputs 7, 8 and 9 of the logic decision circuit and to the register 101 for the reversal bit, said multiplexer having a data output supplying one of the input words;

a group of output registers 1100 connected to the output equipment;

an address sequencing and counting circuit 1200 having respectively initializing, transcoding request, character reading and incrementation clock inputs and respectively page memory reading, loading of the input registers 10, loading of the output registers 11, character validation and page memory address outputs.

FIGS. 7*a* to 7*f* illustrate in greater detail the structure of the transcoder according to the invention, in the case where the input equipment comprises $n=2^n$ colors. For example it can be a videotex with 24 parallel bits and 8 colors, the output equipment having less than 8 and e.g. 2 colors. This example will be considered hereinafter relative to the following drawings, because special solutions correspond thereto.

Figure 7A:
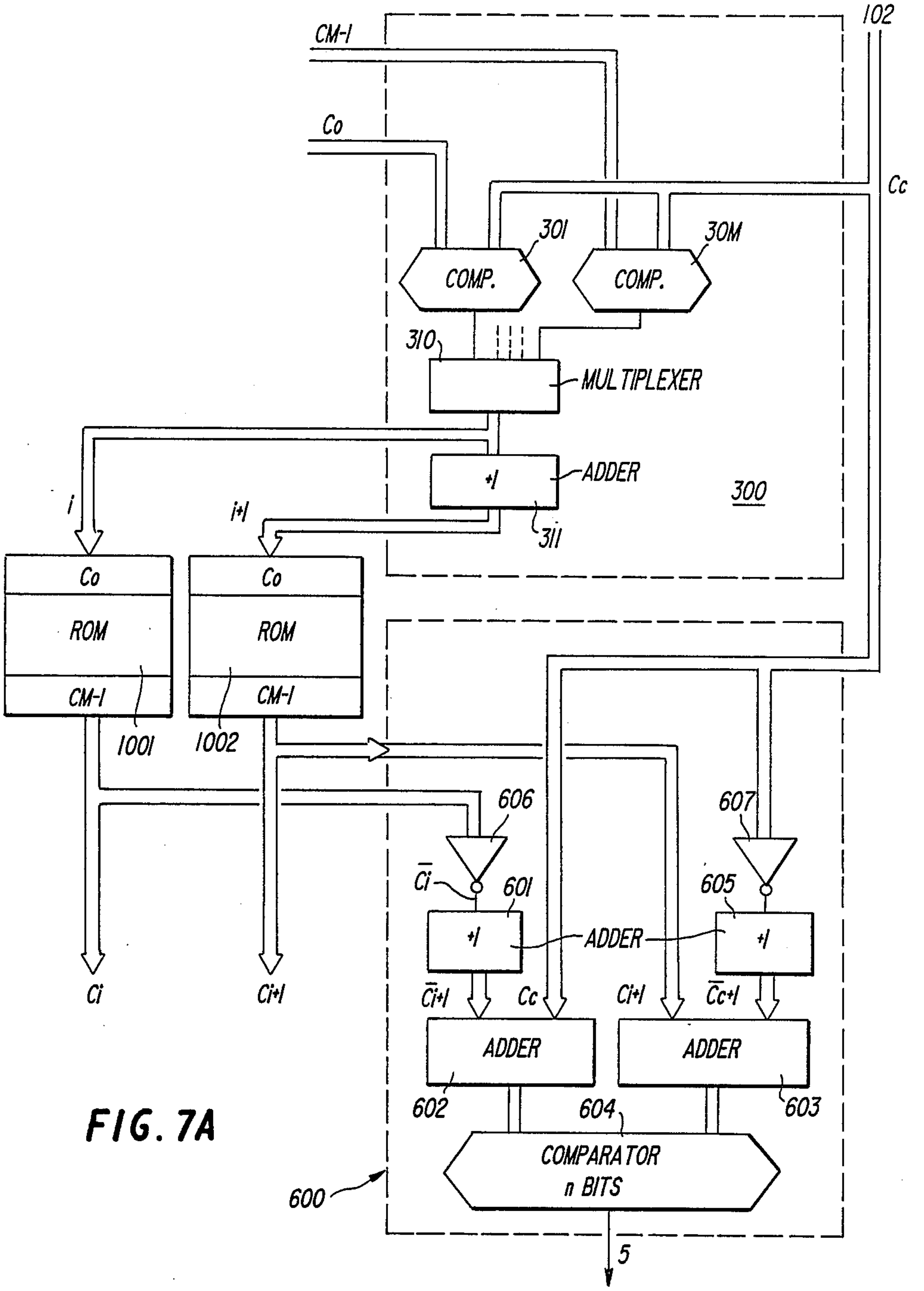
Figure 7B:
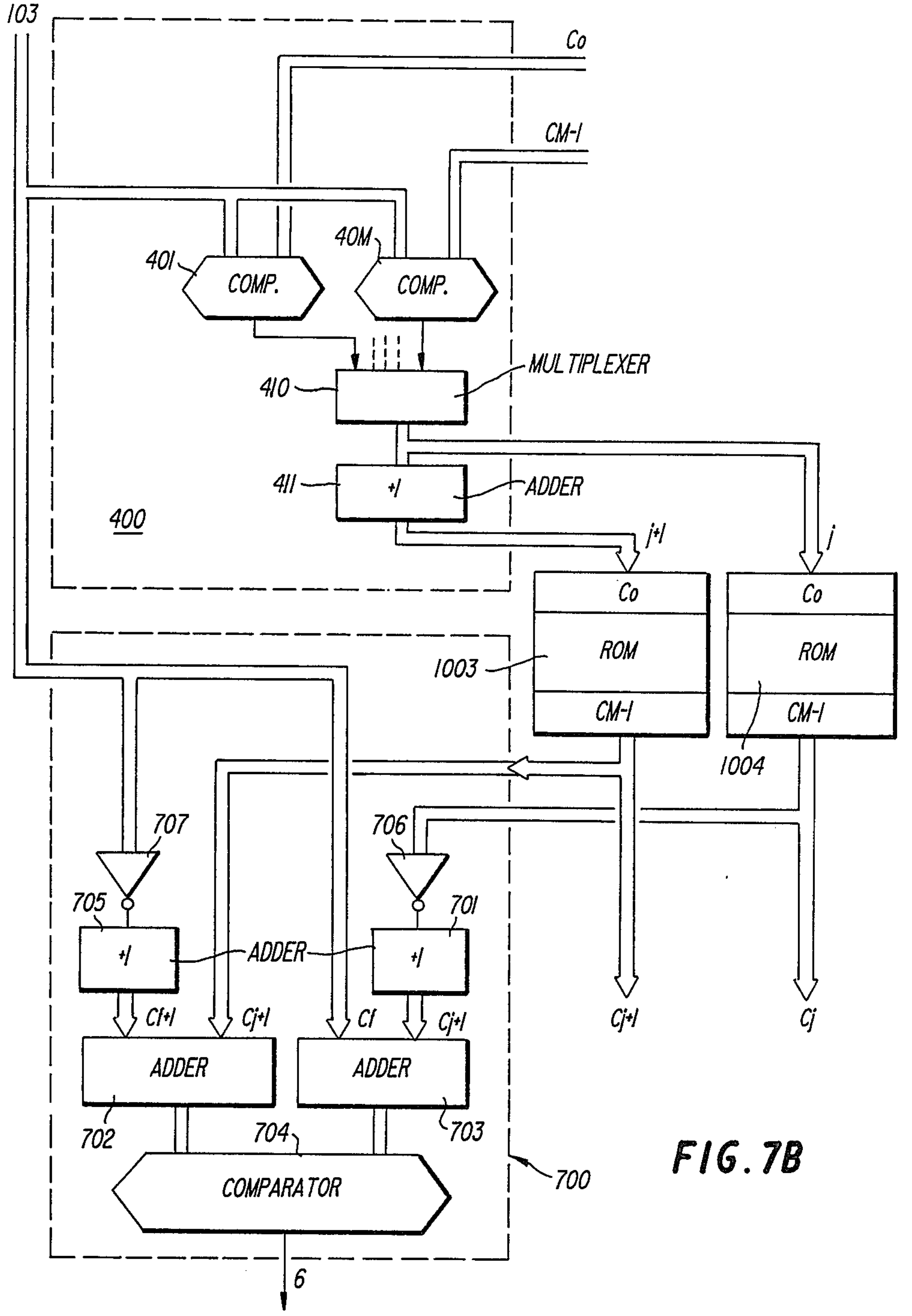
Figure 7C:
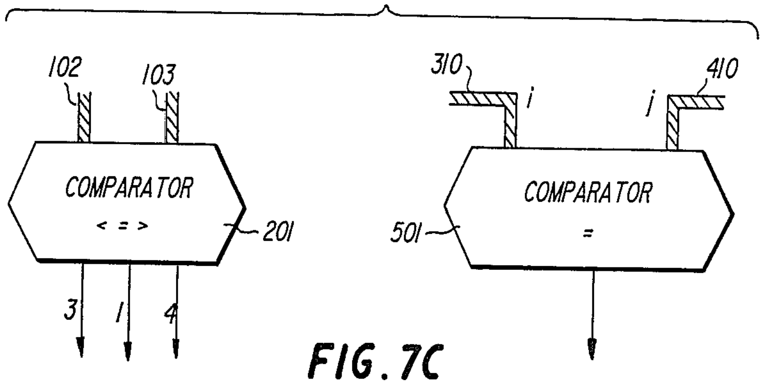

FIG. 7*a* shows a subassembly 300 having M comparators 301 etc . . . 30M with two inputs, one receiving the word Cc from input register 102 and the other one of the words CO, . . . , CM-1 representing the output colors. These comparators work on n bits and have an output indicating whether the word received on one of the inputs is or is not lower than the word received on the other. Subassembly 300 also comprises a multiplexer 310 with M inputs connected to the aforementioned comparators and to m outputs, which by their binary state give the order i of the color Ci for which Ci is less than Cc and for which Ci+1 is higher than Cc. In other words, i is the order of the final comparator 301, . . . , 30M indicating that the color Ci is less than Cc. Subassembly 300 also comprises an adder 311 with n bits, adding 1 to the number i which it receives and thus supplying the number i+1. Subassembly 300 gives the information relative to the interval i/i+1 in which is located the character color Cc.

Two read-only memories 1001 and 1002 containing the words CO, . . . , CM+1 are respectively addressed by i and i+1, so that they supply the words Ci and Ci+1 defining the interval in which Cc is located.

FIG. *7b* shows a subassembly 400 identical to 300 with M comparators 401, . . . , 40M, a multiplexer 410 of the type M→m, an adder 411 and two read-only memories 1003, 1004 supplying the words Cj and Cj+1 defining the interval in which is located the background color Cf contained in input register 103.

The group of our read-only memories 1001 to 1004 constitutes the read-only memory 1000, which can also supply the words CO, . . . , CM−1 necessary for blocks 300 and 400.

To return to FIG. *7a*, there is once again a first comparison unit 600 comprising a NOT circuit or gate 606 receiving the word Ci from memory 1001 and supplying the complementary word $\overline{Ci}$, an adder 601 adding +1 to $\overline{Ci}$ and supplying $\overline{Ci}+1$, an adder 602 with n bits receiving $\overline{Ci}+1$ and Cc and supplying the sum of these two words. Subassembly 600 also comprises a NOT circuit or gate 607 receiving Cc and supplying $\overline{Cc}$, an adder 605 adding 1 to said number, an adder 603 receiving $\overline{Cc}+1$ and Ci+1 from memory 1002 and supplying $\overline{Cc}+1+Ci+1$. Finally, unit 600 comprises a comparator 604 with n bits, which compares $\overline{Ci}+1+Cc$ and $\overline{Cc}+1+Ci+1$. This comparator has an output 5 which is active (i.e. which supplies a logic 1) if $\overline{Ci}+1+Cc$ is less than $\overline{Cc}+1+Ci+1$, in other words if Cc−Ci is less than Ci+1−Cc.

In other words, the comparison of the intervals Cc−Ci and Ci+1−Cc takes place via the calculation of the two's complement of Ci and Cc (inversion and addition of 1).

In the same way, subassembly 700 shown in FIG. *7b* comprises a NOT circuit 706, an adder 701, an adder 703, a NOT circuit 707, an adder 705, an adder 702, a comparator 704, whose output 6 is active if Cf−Cj is less than Cj+1−Cf.

The left-hand part of FIG. *7c* shows a comparator 201 with two inputs, respectively connected to the input registers 102, 103 and receiving Cc and Cf, as well as three outputs 3, 1 and 4, indicating whether Cc is lower, equal to or higher than Cf. FIG. *7c* also shows in its right-hand part, a comparator 501 having two inputs connected to multiplexers 310 and 410, from which it receives numbers i and j, as well as an output 2 indicating whether these two numbers are equal.

Comparator 501 functions with m bits, because i and j in fact have m bits. However, it would be possible to work on words Ci and Cj, provided that the comparator 501 was connected downstream instead of upstream of memories 1001 and 1004.

FIG. *7d* shows two blocks 801 and 802 belonging to the logic decision circuit 800. The first 801 comprises three NOT circuits 897, 898, 899, two AND gates 895, 896 and an OR gate 894 whereof the output 8 is the general output of 801. In the same way, the second block 802 comprises three NOT circuits 890, 891, 892, two AND gates 888, 889 and an OR gate 887, whereof the output 7 is the general output of circuit 802.

Figure 1:
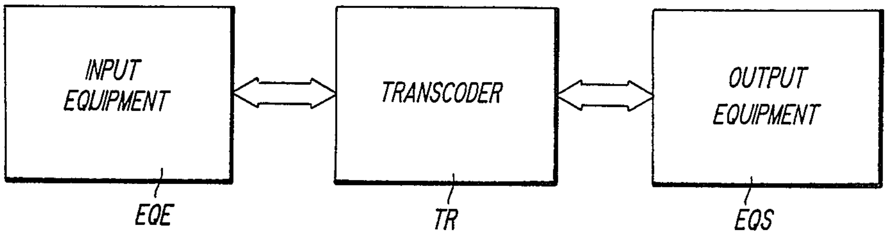
FIGS. 1 and 2, already described, the position occupied by the transducer according to the invention.
Figure 2:
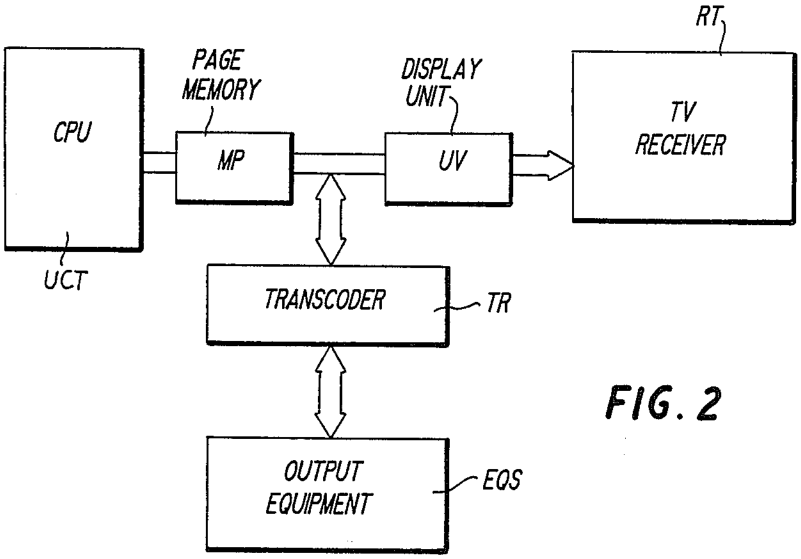
Figure 3:
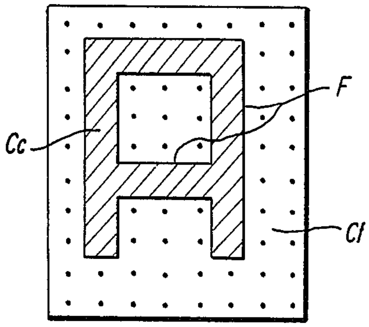
FIG. 3, already described, an alphabetic character.
Figure 4:
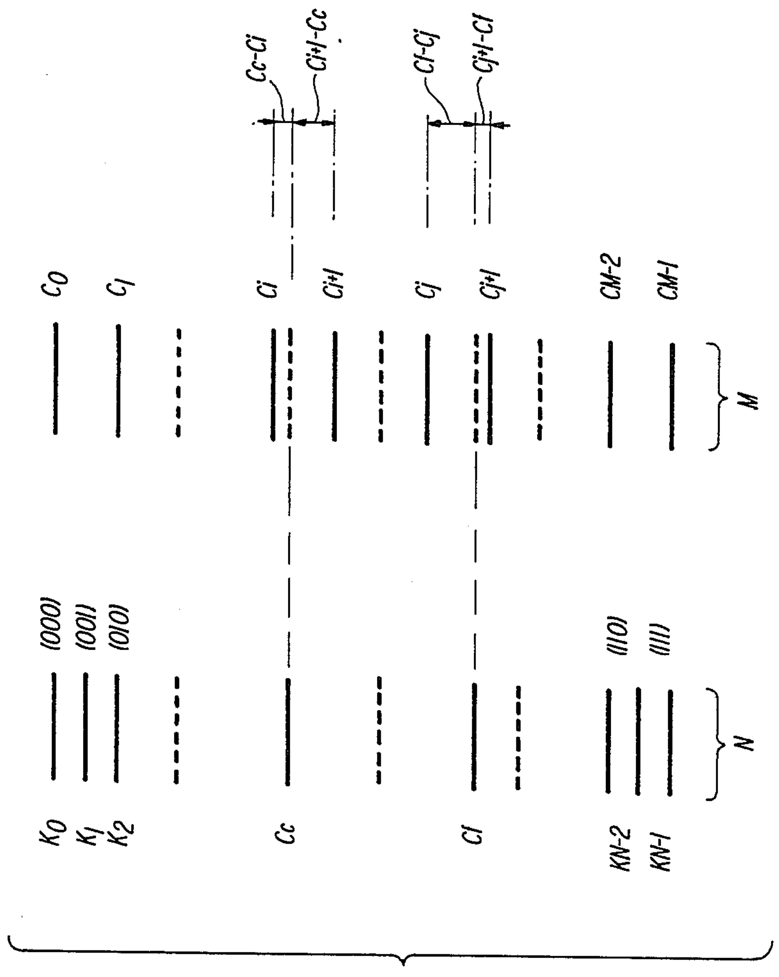
FIG. 4, already described, illustrates bringing about correspondence between two color scales.
Figure 5:
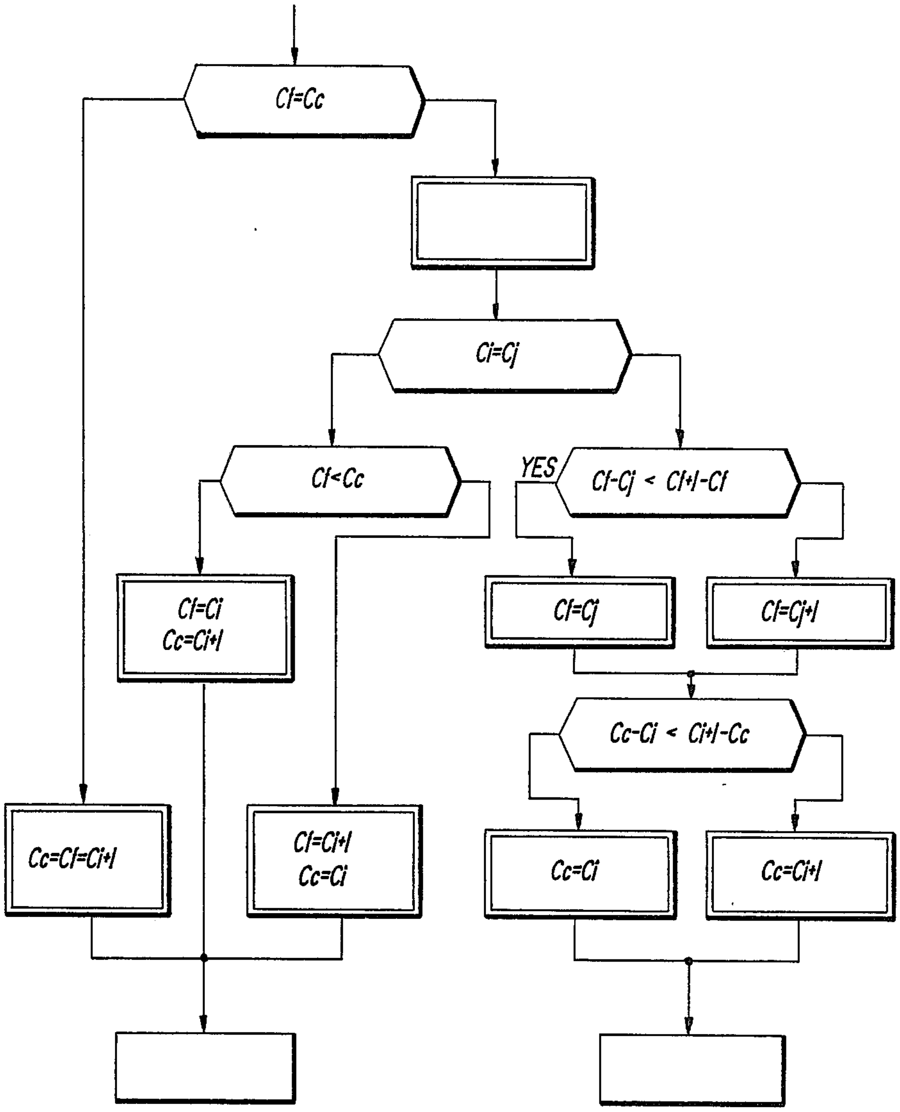
FIG. 5, already described, a flowchart explaining the output color choice process.

The inputs of these different gates are connected to the outputs 1, 2, 3, 4, 5 and 6 of the different circuits referred to hereinbefore (1, 2, 3, 4 are the outputs of comparators 201, 501 of FIG. *7c*, 5 is the output of subassembly of 600 in FIG. *7a* and 6 is the output of subassembly 700 of FIG. *7b*). These logic circuits put into effect the decision algorithm described hereinbefore (FIG. 5).

FIG. *7e* shows the structure of multiplexer 900, which comprises three multiplexers 2→1, the first 901 controlled by the signal from output 1 of comparator 201 and receiving the shape and space data, the second 902 controlled by the signal from output 7 of logic circuit 802 and receiving the words Ci and Ci+1, and the third 903 controlled by the signal from output 8 of circuit 801 and receiving the words Cj and Cj+1.

Thus, according to the value of signal 1, a selection takes place either of the shape or of the space; according to signal 7 either of Ci or of Ci+1 and according to signal 8 either of Cj or Cj+1.

The word relative to the shape, i.e. R0 is loaded into an output register 1108. The word R1, relative to the colors, is loaded into a double register 1109, 1110 for Cc and Cf. These output registers are actuated by a connection 11 from sequencer 1201. The output of these registers is connected to the output equipment, which consequently receives a shape information R0 and a color information R1.

Finally, FIG. *7f* shows details of the sequencing circuit, which comprises a sequencer 1201 and a counter 1202, with connections referred to hereinbefore relative to FIG. *6b*. Reference is merely made to a supplementary connection for the zeroing of the counter by the sequencer.

The timing chart of FIG. 8 illustrates the operation of the transcoder, whose components are shown in FIGS. *7a* to *7f*. This operation is broken down into the various phases indicated on the lower line:

Phase $\phi$o: On making live, the sequencer is initialized by the initialization wire, bringing about a zeroing of the address counter, sets to 1 the reading wire of the image memory $\overline{RD}$ and to 0 the "valid character" wire (inactive state), it supplies no signal until it receives the transcoding request signal (first line).

Phase $\phi$1: Transcoding request (transition 0→1).

Phase $\phi$2: Consists of the preparation phase of R0 and R1, which are the contents of the output registers. The transcoder transmits signal RD to the image memory ($\overline{RD}$=0) and the loading signal of the input registers 101 to 105 by connection 10. Thus, this signal makes it possible to load reversal informations into 101, character color Cc informations into 102, background color Cf informations into 103, attributes A informations into 104 and shape F informations into 105. The size of the group of registers 101 to 105 is 24 bits with 1 bit for reversal, 3 for character color, 3 for background color and generally 8 bits for the shape F. The transcoder then compares Cf and Cc in the 3 bit comparator 201 and the result is given by the state of the 3 wires, 1, 3, 4. If Cf=Cc (wire 1 active), the 8 bit multiplexer 901 validates the space code, i.e. R0 is loaded by the space. If not it validates the shape F. The group of shape attributes other than reversal (height, width, "incrustation", masking, underlining, flashing, etc.), are loaded without change into R1. The reversal bit is the result of a simple combinatory logic 802 translating the algorithm. The reversal is validated (wire 2) if there is a videotex reversal (1 active) and Cf>Cc if there is no videotext reversal and Cf<Cc. As the R0 and R1 informations are ready, the sequencer transmits a signal for the loading of the output registers 108, 109 by connection 11.

Phase φ3: End of acquisition of R0 and R1. This phase is initiated by the transition 0→1 of the "character valid" signal.

Phase φ4: Awaiting the "character read" signal transmitted by the output equipment in acknowledgment of "character valid". It should be noted that before transmitting the "character read" signal, the incrementing clock of the address counter will have been supplied beforehand to the counter 1202.

Phase φ5: Reading of character at transition 1→0 of the "character valid" signal.

Following incrementation by one unit of the address counter either by the output equipment (case of certain flat-faced screens) or by the sequencer (case of printers), the various phases are rerun for the processing of the following character.

In the case of videotex, besides the sets of alphanumeric characters, use is made of semigraphic sets, whereof the principle is illustrated in FIG. 9*a*. The matrix containing the character is broken down into 6 blocks or boxes $b_0$ to $b_5$, each of which can be illuminated or extinguished, so that 64 different shapes or forms are obtained. Each of these can be made to correspond with the complementary shape, as illustrated in FIG. 9*b*. The two shapes shown are said to be "matched". It is possible to pass from one to the other by reversing the control of the state of the blocks.

The set of alphanumeric characters is also linked with a reversal bit.

In general terms, if the reversal bit is present, the form or shape of the character will be designated $\overline{F}$. Thus, the transcoder must be designed so as to be able to take account of this information relative to the reversal. As illustrated in FIG. 6*a*, it is the function of input register 101 to store the reversal bit I. FIG. 10 illustrates this aspect in a simple case where the output equipment only uses two output colors. Thus, in this case there is only a single color range at the output. It is defined by the black corresponding to Ci and by the white corresponding to Ci+1. Thus, in this case there is Ci=Cj and the flowchart of FIG. 5 is simplified considerably in the manner shown in FIG. 10. The flowchart shown can be read in the following way:

(A) if Cf=Cc then the transmitted shape (R0) is the space;
(B) if not Cf≠Cc, then a single case occurs because there is only a single range in the group of arrival colors:
  (Ba) if reversal is not valid:
    if Cf>Cc R0 is constituted by shape F
    if Cf<Cc R0 is constituted by the reversed shape $\overline{F}$
  (Bb) if reversal is valid:
    if Cf>Cc R0 is constituted by the reversed shape $\overline{F}$
    if Cf<Cc R0 is constituted by the shape F.

This algorithm is applied differently as a function of whether the output equipment interprets or does not interpret the reversal bit.

If the output equipment has reversal, it then becomes:
(A) If Cf=Cc then the transmitted shape is the space,
(B) if not Cf≠Cc:
  (Ba) for I not valid:
    if Cf>Cc R0=F, reversal bit not valid
    if Cf<Cc R0=F, reversal bit valid
  (Bb) for I valid:
    if Cf>Cc R0=F, reversal bit valid
    if Cf<Cc R0=F, reversal bit not valid.

In the case where the output equipment only functions with two colors, the structure of the transcoder is simplified compared with the general variant of FIGS. 7*a* to 7*f*. The corresponding diagram is shown in FIG. 11, where the numerical references designate the same elements as for FIGS. 7*a* to 7*f*. The notations α and γ of the register 105 signify "alphanumeric" and "graphic". The notation HlClmis for register 104 designates attribute codes respectively signifying "height, width, flashing, masking, incrustation, underlining". These attributes will completely occupy the output register 1109 (content R1). In this special case, there is really no color word to be selected.

The preceding variant corresponds to the case where reversal is not possible in the output equipment. Naturally, the invention can be applied in the case where the said equipment would not accept reversal. The decision algorithm would then be slightly modified to simulate this reversal by acting on the shape of the displayed character. The output register 1109 loading R1 would no longer contain the information I and the register loading R0 would contain either F or $\overline{F}$. This assumes that multiplexer 901 receives not only shape F, but also the reversed shape $\overline{F}$ and not only the space, but also the solid block. Thus, multiplexer 901 passes from type 2→1 to type 4→1.

A second variant of the transcoder according to the invention will now be described relating to the videotex with 16 parallel and series bits, with 8 colors for the input equipment, the output equipment being a printer or a flat-faced screen with two colors and not having a reversal bit. This is the most complex case.

The restriction of the videotex to terminals with 16 bits leads to supplementary constraints with respect to the transcoder.

(a) Firstly the background color is a "series" attribute for alphanumeric characters (it is consequently an attribute defined by the zone) and a "parallel" attribute for the semigraphic characters. This requires the addition of a background color locking cell.

(b) Use is made of special characters, called delimiters, which introduce zones for the series attributes. As a function of the context, they are to be displayed as spaces or solid blocks. In the same way as for the alphnumeric characters, it is necessary to know the zone type in which the delimiter is located, i.e. reversible or non-reversible zone. If the character following the delimiter is semigraphic, the latter will be in a reversible zone and otherwise it will be displayed as a space. This point is illustrated by the example shown in FIG. 12. The image shown comprises a non-reversible zone in which appear alphabetical characters forming the expression "L'ARBRE" and a reversible zone in which semigraphic characters appear. In the non-reversible zone the delimiter (white square) is displayed as a space, no matter what the colors Cc and Cf. In the reversible zone, the delimiter is displayed as a solid block (if the background had been yellow, it would have been displayed as a space).

(c) Finally, on erasing or clearing the screen, the latter is filled with semigraphic spaces, so as to prevent series parasitic effects during the filling of the screen. At the algorithm they must not be considered as semigraphic characters, because they are only there due to constraints linked with the videotex and not as graphic elements as such.

The completed algorithm is then in the form indicated in FIG. 13 where, apart from already described operations in connection with FIG. 5, are shown tests concerning the presence of a delimiter, on the semigraphic nature of the character following said delimiter, on the presence of a graphic filling character and on the validity of a graphic environment.

This flowchart is then read in the following manner:

(A) if the character is a delimiter, then:

(Aa) if the following character is semigraphic defined by C'c and C'f then:

(α) if Cc=C'f then if C'f graphic ≧C'c graphic, R0=space, if not R0=solid block, (β) if Cc≠C'f then if C'f<Cc, R0=space, if not R0=solid block, (Ab) if the character is not semigraphic, then R0=space;

(B) if the character is not a delimiter:

(Ba) if it is a semigraphic:

(α) if it is a semigraphic filling character, then R0=space (β) if it is not a semigraphic filling character, then the "graphic surrounding" is validated, whereas if Cf=Cc, R0=space, and if Cf≠Cc, then R0=shape if Cf>Cc and R0=$\overline{F}$ if Cf<Cc;

(Bb) if it is not semigraphic (then it is alphanumeric)

(1) if it is the space:

(1α) if the "graphic surrounding" signal is not validated, then R0=space, (1β) if the "graphic surrounding" signal is validated and if there is reversal, then R0=space if Cf≦Cc and R0=solid block, in the opposite case and there is no reversal then R0=space if Cf≧Cc and R0=solid block;

(2) if there is no space, or in other words it is an alphanumeric character outside the space, then the "graphic surrounding" signal is not validated and R0=F.

FIGS. 14*a* to 14*f* illustrate the structure of the transducer in this particular case, with the same conventions for the numerical references as in the preceding drawings. Moreover, the 16 bits from the image memory are designated B0 to B15. The colors are coded on 3 bits designated BcVcRc for the character color and BfVfRf for the background color. The different bits of the color words are carried by connections 13, 14, 15 for BfVfRf and 16, 17, 18 for BcVcRc for a given character and respectively 22, 23, 24 and 25, 26, 27 for the following character. Connection 12 carries a signal relating to the presence of delimiters.

Figures 14A, 14B:
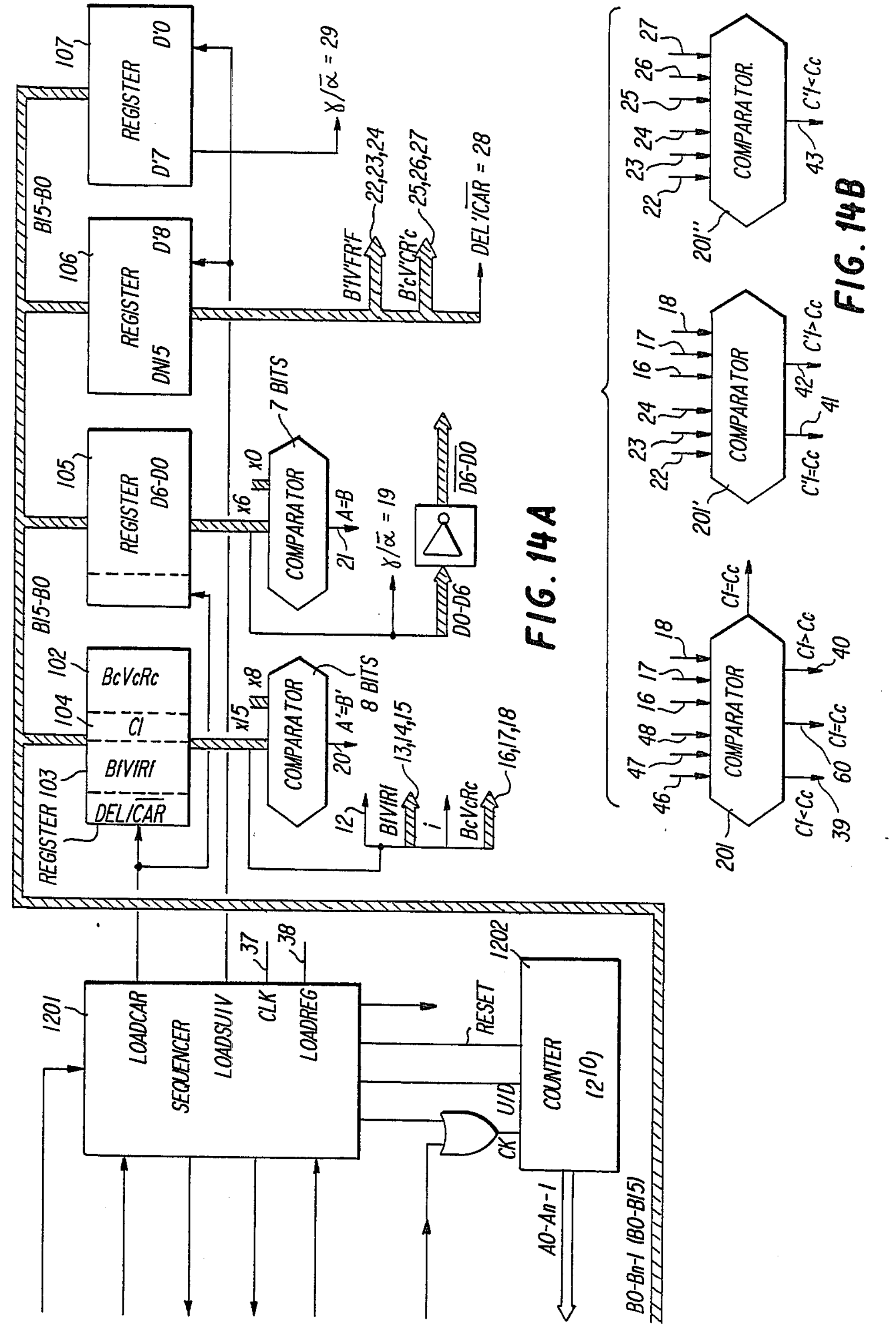

In FIG. 14*a* it can be seen that the input register comprises two supplementary registers 106, 107 for receiving the 16 bits (D'0, . . . , D'7 and D'8, . . . , D'15) of the character of order n+1, when the character of order n is loaded into registers 102, 103, 105.

Shape F is coded on 7 bits (D0–D6), which are compared with 7 bits X0–X6 of the space in comparator 1402, whose output is designated 21. In the same way for the 8 space bits X8 to X15, they are compared with 8 character bits from 102, 103, 104 in comparator 1403, whereof the output is designated 20.

Figure 14D:
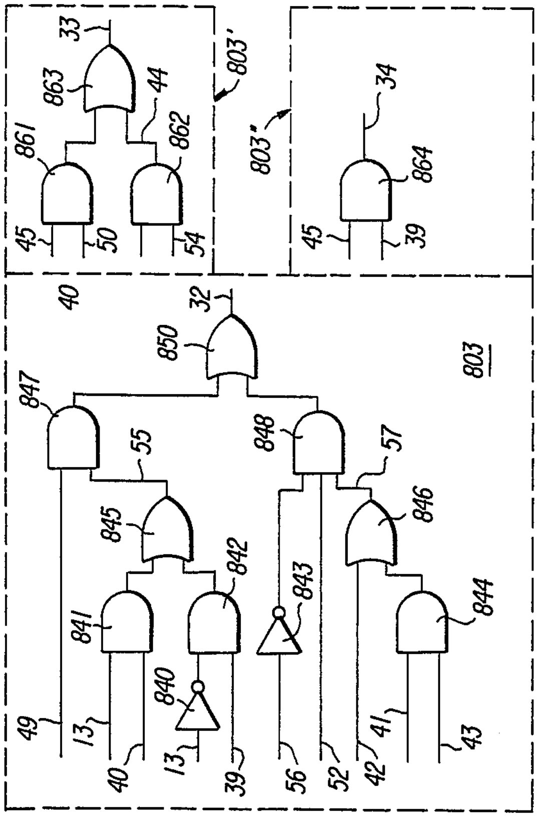
Figure 14C:
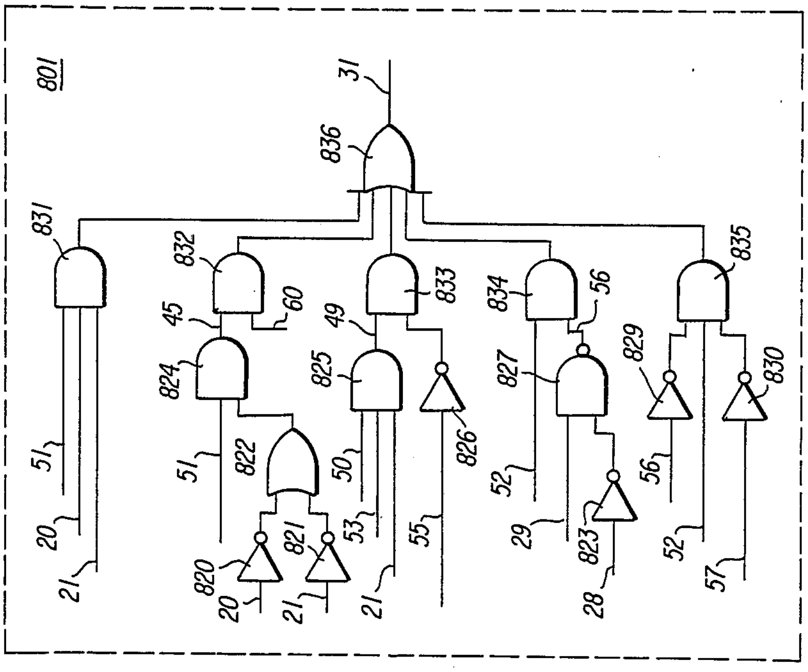
Figures 14E, 14F:
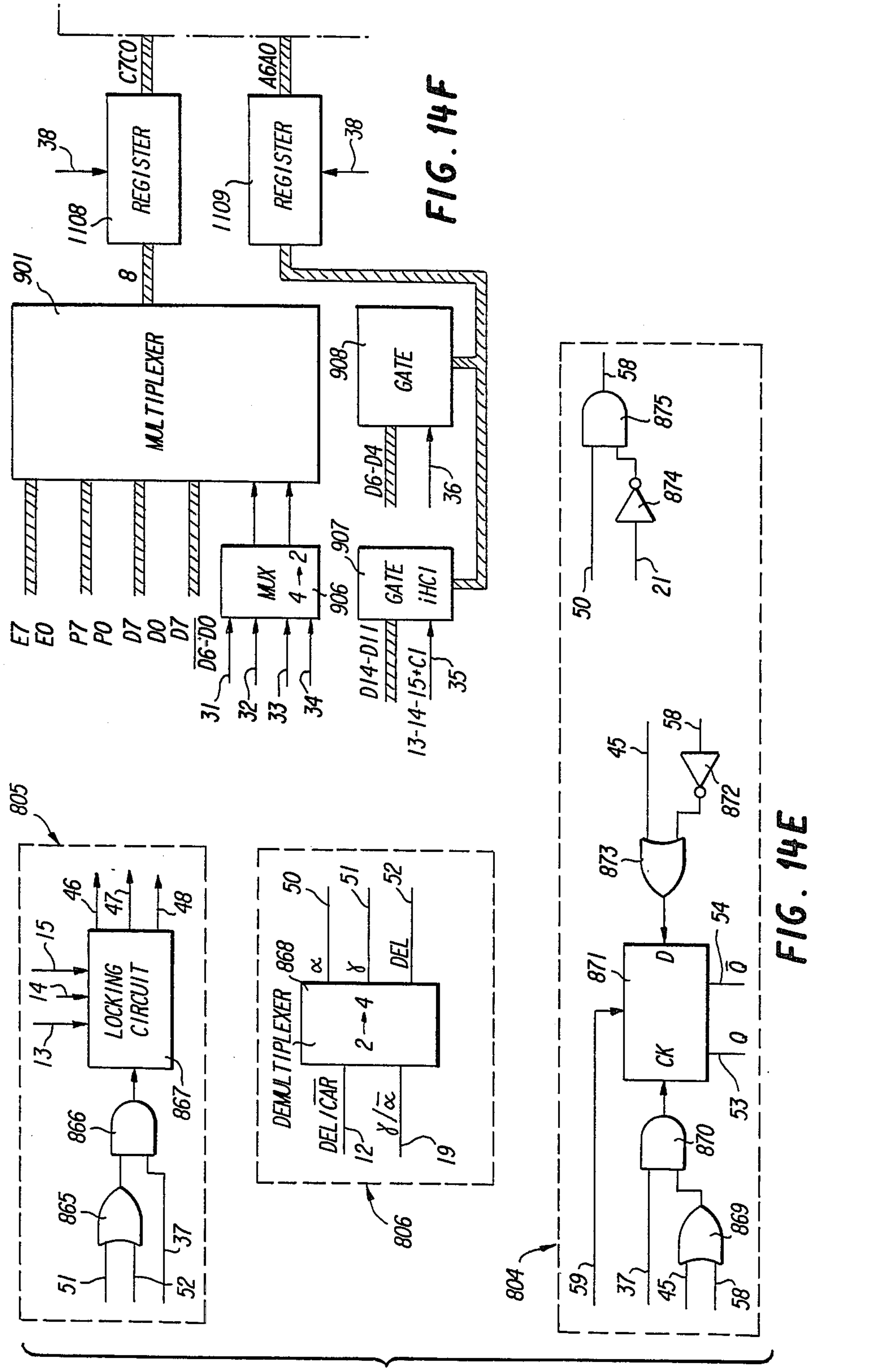

FIG. 14*b* shows three comparators 201, 201' and 201'', whose function is to respectively compare the 3 bits carried by the 3 connections 46, 47, 48 from a logic 805 shown in FIG. 14*e* with the 3 bits of Cc carried by connections 16, 17, 18, the 3 bits of C'f and Cc, and the 3 bits of C'f and C'c.

The outputs of these comparators which are used are respectively designated 39, 40, 60 for the first, 41, 42 for the second and 43 for the third.

FIG. 14*c* shows an embodiment for a first logic decision circuit 801, which comprises two NOT circuits or gates 820, 821 connected to an OR gate 822, a NOT circuit 823, AND gates 824, 825, a NOT circuit 826, a NAND gate 827, two NOT circuits 829, 830, five AND gates 831, 832, 833, 834 and 835 and finally an OR gate 836, whose output 31 constitutes the output of circuit 801. The function of the latter is to select a code corresponding to a graphic space.

FIG. 14*d* shows 3 other logic circuits. The first 803 comprises a NOT circuit 840, two AND gates 841, 842, a NOT circuit 843, an AND gate 844, two OR gates 845, 846, two AND gates 847, 848 and finally an OR gate 850, whose output 32 constitutes the general output of circuit 803. This circuit is used for selecting the solid graphic block.

Circuit 803' comprises two AND gates 861, 862 and an OR gate 863 of output 33. The function of this circuit is the selection, for R0, of shape bits D7–D0.

Finally, circuit 803'' is constituted by a single AND gate 864 of output 34. Input 45 of said gate corresponds to the output of gate 824 of circuit 801. Circuit 803'' is used for selecting bit D7 and the complementary bits $\overline{D6–D0}$ for R0.

FIG. 14*e* shows other logic decision circuits. Circuit 805 comprises an OR gate 865, an AND gate 866, a locking circuit 867 with three outputs 46, 47 and 48. The function of circuit 805 is the background color locking when a delimiter or graphic character is present.

Circuit 806 comprises a demultiplexer of type 2→3, whereof the three outputs are 50, 51, 52. The function of circuit 806 is the separation between the delimiter, the graphic character and the alphanumeric character.

Finally, circuit 804 comprises an OR gate 869, an AND gate 870, a flip-flop 871, a NOT circuit 872 and an OR gate 873. It has outputs 53 and 54. Moreover, circuit 804 also has a NOT circuit 874 and an AND gate 875 of output 58.

The numerical references associated with the connections involved in all the logic decision circuits make it possible to establish the appropriate connections.

FIG. 14*f* shows the output elements of the transcoder. Multiplexer 901 receives data in the form of bits E7–E0 representing the graphic space code, bits B7–B0 representing the solid block code, bits D7–D0 representing the shape and bits D7 $\overline{D6–D0}$ representing the reversed shape. This multiplexer 901 is controlled by the bits carried by connections 31, 32, 33, 34 from the logic decision circuits 801, 803, 803' and 803'' of FIGS. 14*c* and 14*d*, said bits being multiplexed beforehand in a multiplexer 906 of type 4→2 and whereof the outputs are designated 29 and 30.

The elements shown in FIG. 14*f* also have a gate 907 receiving on the one hand bits D14–D11 and on the other hand the bits of attributes I, h, l by connections 13, 14 and 15, as well as the flashing bit C1, said gate 907 being controlled by a connection 35.

Finally the circuit comprises a gate 908 receiving data D6–D4 and controlled by a connection 36.

The data passing through the multiplexer 901 are loaded into register 1108. Those which have passed through gates 907 and 908 are loaded into register 1109.

These two registers are controlled by the sequencer via connection 38 shown in FIG. 14*a*. These two registers respectively supply bits C7–C0 characterizing the shape and bits A6–A0 characterizing the attributes of the character.

Multiplexer 901 has the function of performing:

(a) the selection R0=F if there is a semigraphic character out of page erasure or clearance connection (45) and if Cf>Cc (40) or if there is an alphanumeric character (50) with an unvalidated "graphic environment" signal (54). The logic relation effected by 803' must consequently be:

33=(45 AND 40) or (50 AND 54)

The activation of 33 will enable the multiplexer to select F.

(b) the selection R0=$\overline{F}$ if there is a semigraphic out of page erasure or clearance and if Cf<Cc. The logic relation realised by 803'' must therefore be:

34=(45 AND 39)

The activation of 34 will then permit the multiplexer to select $\overline{F}$.

(c) "solid block" selection if there is:

(c1) either an alphanumeric space (50 AND 21) in a validated "graphic environment" (53), which implies 49=(50 AND 21 AND 53) in 801 with I=0 (13) and Cf<Cc (39) or I=1 and Cf>Cd (40). The logic operation performed by circuit 803 is consequently:

49 and [(39 and $\overline{I}$) OR (40 AND I)]

(c2) or a delimiter (52) followed by a graphic (56) and:

(C'f=Cc AND C'f<C'c)=(41 AND 43) OR C'f>Cf (42)

This leads to the logic operation performed by circuit 803:

($\overline{56}$ AND 52) AND ((41 AND 43) OR 42)

These two conditions can be written:
RO="solid block" if:

32=49 [(39 and $\overline{I}$) OR (40 AND I) or $\overline{56}$ and 52 [(41 AND 43) OR 42]]

(d) the "space selection"=R0 if there is:

(d1) either a delimiter not followed by a graphic (52 AND 56)

(d2) or a delimiter followed by a graphic and C'f=Cc and C'f≧C'c or C'f<Cf thus $\overline{57}$ (d3) or a space alphanumeric in a graphic environment (49) with I=0 and Cf≧Cc or I=1 and Cf≦CC ($\overline{55}$)

(d4) or a page erase graphic (51 AND 20 AND 21)

(d5) or a graphic out of page erasure (45) with Cf=Cc (60).

These 5 conditions can be written in the logic form:
RO="space" if:

31=(52 AND 56) $\overline{57}$ OR $\overline{55}$ OR (51 AND 20 AND 21) OR 45 AND 60).

Thus, the following modifications have been made compared with the transcoder of FIG. 7:

addition of an 8 bit comparator (1403) to detect the "filling graphic" configuration;

addition of a demultiplexer 806 for distinguishing the delimiter (active connection 52), the alphanumeric 50 and the graphic 51;

addition of a locking cell 805 for the background color when there is a delimiter 52 or a semigraphic, said cell being locked on a transition of the signal carried by connection 57 from the sequencer (output CLK) and if 51 or 52 are active-connections 46, 47 and 48 supplying the 3 background color bits Cf;

addition of two 8 bit input registers 106 and 107 for storing the following character;

addition of two 3 bit comparators 201', 201'' for comparing C'f−Cc and C'f−C'c and use of connections 41 for C'f=Cc, 42 for C'f>Cc and 43 for C'f<C'c;

modification of the control signals of the multiplexer 901.

The timing chart of FIG. 15 explains the operation of this variant of the transcoder. It is more complex than the previous variant (cf. FIG. 8), even if the same phases initially appear. However, it comprises an operation of loading supplementary input registers 106, 107 relative to the following character. Thus, it is phase $\phi 2$ which is made more burdensome, because it is necessary to have a double memory addressing for acquiring the following character (case of delimiter).

For this phase $\phi 2$, the sequencing is then as follows: supplying a first read signal RD to the page memory to acquire the character to be transcoded; this signal is followed by a loading signal for input registers 101 to 105 (3rd line); the address counter 1202 has an up/down count input (U/D) in the up-count position; the sequencer supplies a signal CK which increments the address and a signal CLK which locks the background color (case of delimiter and graphics). A signal RD is then supplied for acquiring the following character, the latter being followed by a loading signal for input registers 106, 107 and bringing the counter input into the count-down position. The sequencer then supplies a new signal CK to return to the initial address and returns the U/D input to the up-count position and supplies the "character valid" signal.

I claim:

1. Color transcoding process permitting the interconnection between an input equipment and an output equipment:

said input equipment incorporating a page memory, whose content can define a mosaic-type image formed from characters, each defined by a shape (F), a character color (Cc), a background color (Cf) and various other character features, the character color (Cc) and background color (Cf) being taken from a group of N colors;

said output equipment incorporating means for the display of the mosaic-type image with the aid of characters having a shape, a character color and a background color, the character and background colors being taken from a group of M colors, M being less than N, said transcoding process comprising the following steps:

allocating to each of the M colors of the output equipment a binary word with m bits, the M words being classified in accordance with a certain order, said M words being completed to n bits and the M corresponding words being classified (C0, C1, . . . Ci, Ci+1, . . . Cj, Cj+1, . . . , CM−1) in a memory, storing for each character to be transcoded, a word of n bits corresponding to the character color Cc and a word of n bits corresponding to the background color Cf, determining a range Ci−Ci+1 in which is located a word Cc corresponding to color Cc and a range Cj−Cj+1 in which is located a word Cf corresponding to color Cf and, taking the character color either as the color corresponding to word Ci, or the color corresponding to color Ci+1 and the background color is taken either as the color corresponding to color Cj, or as the color corresponding to color Cj+1, the choice in this double alternative being dictated by the comparison of the words Cf and Cc so that (A) if the word Cc is not equal to the word Cf, then the shape of the character is not modified and word Ci is compared with word Cj to determined whether Ci is equal to Cj or whether Ci is not equal to Cj:

(Aa) if Ci is not equal to Cj:

(Aa1) determination takes place to establish which is the smaller of two differences Cf−Cj and Cj+1−Cf; if Cf−Cj is the smaller difference then the color Cj is chosen for for the background color, whereas if Cj+1−Cf is the smaller difference, then the color Cj+1 is chosen for the background color, (Aa2) it is established which is the smaller of two differences Cc−Ci and Ci+1−Cc; if Cc−Ci is the smaller difference, then color Ci is chosen for the character color, whereas if Ci+1−Cc is the smaller difference, then color Ci+1 is chosen for the character color;

(Ab) if the word Ci is equal to the word Cj, determination takes place to establish whether Cf if smaller than Cc, if Cf is smaller than Cc the color Ci is chosen for the background color, and the color Ci+1 for the character color, whereas if Cf is not smaller than Cc, the color Ci+1 is chosen for the background color and color Ci for the character color; and (B) if the word Cf is equal to the word Cc, the shape of the character is taken as being identical to the background and the color of the space is taken as equal to one of the colors Ci and Ci+1.

2. A color transcoder permitting the interconnection between an input equipment and an output equipment, said input equipment incorporating a page memory, whose content is able to define a mosaic-type image formed from characters each of which is defined by a shape (F), a character color (Cc), a background color (Cf) and various other character features, the character and background colors (Cc) and (Cf) being taken from a group of N colors, said output equipment incorporating a means for displaying the mosaic-type image in question with the aid of characters having a shape, a character color and a background color, the character and background colors being taken from a group of M colors, M being smaller than N, said transcoder comprising:

a group of input registers connected to the page memory of the input equipment and able to store digital data corresponding to various characters to be displayed, said group in particular having a register storing a word of n bits corresponding to the character color Cc and a register storing a word of n bits corresponding to the background color Cf, a first comparator with n bits having two inputs respectively connected to two input registers, from where they receive the words corresponding to colors Cc and Cf and three outputs, whereof the binary state indicates whether Cc is smaller, equal to or higher than Cf, a read-only memory having M words (C0, C1, . . . Ci, Ci+1 . . . Cj, Cj+1 . . . , CM−1) of n bits correspond to M colors of the output equipment, said words being completed to n bits and classified in a given order, each word being addressable in the memory by a symbol (i or j) defining the order of the word, a first subassembly making it possible to determine in which range Ci−Ci+1 is located the word Cc, said first subassembly having a first input connected to the input register from which it receives the word Cc and a second input connected to the read-only memory, as well as two outputs supplying the words Ci and Ci+1 defining the range in which Cc is located, a second subassembly making it possible to determine in which range Cj−Cj+1 is located the word Cf, said second subassembly having a first input connected to the input register from which it receives the word Cf and a second input connected to the read-only memory, as well as two outputs supplying the words Cj, Cj+1 defining the range in which Cf is located, a second comparator having two inputs receiving the words Ci and Cj and having an output, whereof the binary state indicates whether Ci and Cj are or are not equal, a first comparison unit to calculate differences Cc−Ci and Ci+1−Cc and determine which of these two differences is the smaller, said first unit having first and second inputs respectively connected to the two outputs of the first subassembly from where they receive the words Ci and Ci+1, as well as a third input connected to the input register from where it receives the word Cc, said first unit having an output, whose binary state indicates whether Cc−Ci is or is not smaller than Ci+1−Cc, a second comparison unit to calculate the differences Cf−Cj and Cj+1−Cf and determine which of said two differences is the smaller, said second unit having first and second inputs respectively connected to the two outputs of the second subassembly from where they receive the words Cj and Cj+1 and a third input connected to the input register from where it receives the word Cf, said second unit having an output, whereof the binary state indicates if Cf−Cj is or is not lower than Cj+1−Cf, a logic decision circuit incorporating at least six inputs respectively connected to the inputs of the first comparator, to the output of the first comparison unit, to the output of the second comparison unit and to the output of the second comparator, said logic circuit performing a choice operation said circuit having three outputs, the first supplying a first bit, the second supplying a second bit and the third supplying a third bit, a multiplexer means having data input connected to the first and second subassemblies and receiving words defining character features, as well as control inputs connected to the outputs of the logic decision circuit, said multiplexer means having a data output, a group of output registers having an input connected to the output of the multiplexer means and an output connected to the output equipment, and a sequencing and address counting circuit having a plurality of inputs respectively for receiving initialization, transcoding request, character reading and incrementation clock commands, as well as a plurality of outputs for outputting respectively control, page memory read, loading the group of input registers, loading the group of output registers, character validation and address output commands.

3. Transcoder according to claim 2, wherein the input register comprises a register for storing to a reversal bit.

4. Transcoder according to claim 2, wherein the input register comprises two supplementary registers for storing information relative to a next character following a currently processed character.

5. Transcoder according to claim 4, further comprising two supplementary comparators for comparing the color of the currently processed character Cc and the background color of the next character C'f, and for comparing the colors C'f and C'c of the next character.

6. Transcoder according to claim 4, further comprising a supplementary input register loaded by a bit indicating the presence of a delimiter character.

7. Transcoder according to any one of the claims 2 to 6, wherein 3 bit units are used for processing N=8 colors.

* * * * *